United States Patent [19]

Welsh

[11] 4,143,327

[45] Mar. 6, 1979

[54] METHOD AND APPARATUS FOR GENERATING TONE SIGNALS AND THE LIKE

[75] Inventor: Alan B. Welsh, Jasper, Ind.

[73] Assignee: Kimball International, Inc., Jasper, Ind.

[21] Appl. No.: 813,824

[22] Filed: Jul. 8, 1977

[51] Int. Cl.² .............................................. H03K 1/16
[52] U.S. Cl. .......................................... 328/61; 328/48; 328/129; 84/1.19
[58] Field of Search ..................... 328/48, 129, 60, 61; 84/1.11, 1.19

[56] References Cited

U.S. PATENT DOCUMENTS

| | | | |
|---|---|---|---|
| 3,579,126 | 5/1971 | Paul | 328/48 |
| 3,801,917 | 4/1974 | Weinstein | 328/129 |
| 3,936,745 | 2/1976 | Harrington | 328/129 X |
| 4,084,127 | 4/1978 | Tults | 328/129 X |

Primary Examiner—John S. Heyman
Attorney, Agent, or Firm—Albert L. Jeffers; John F. Hoffman

[57] ABSTRACT

A method and apparatus for generating tone signals and the like in which a given frequency is employed for controlling a counter arrangement at a frequency which is equal to the frequency of the given signal multiplied by a factor other than a whole number. The multiplied frequency output when divided down will yield a frequency differing a desired amount from the given frequency.

18 Claims, 3 Drawing Figures

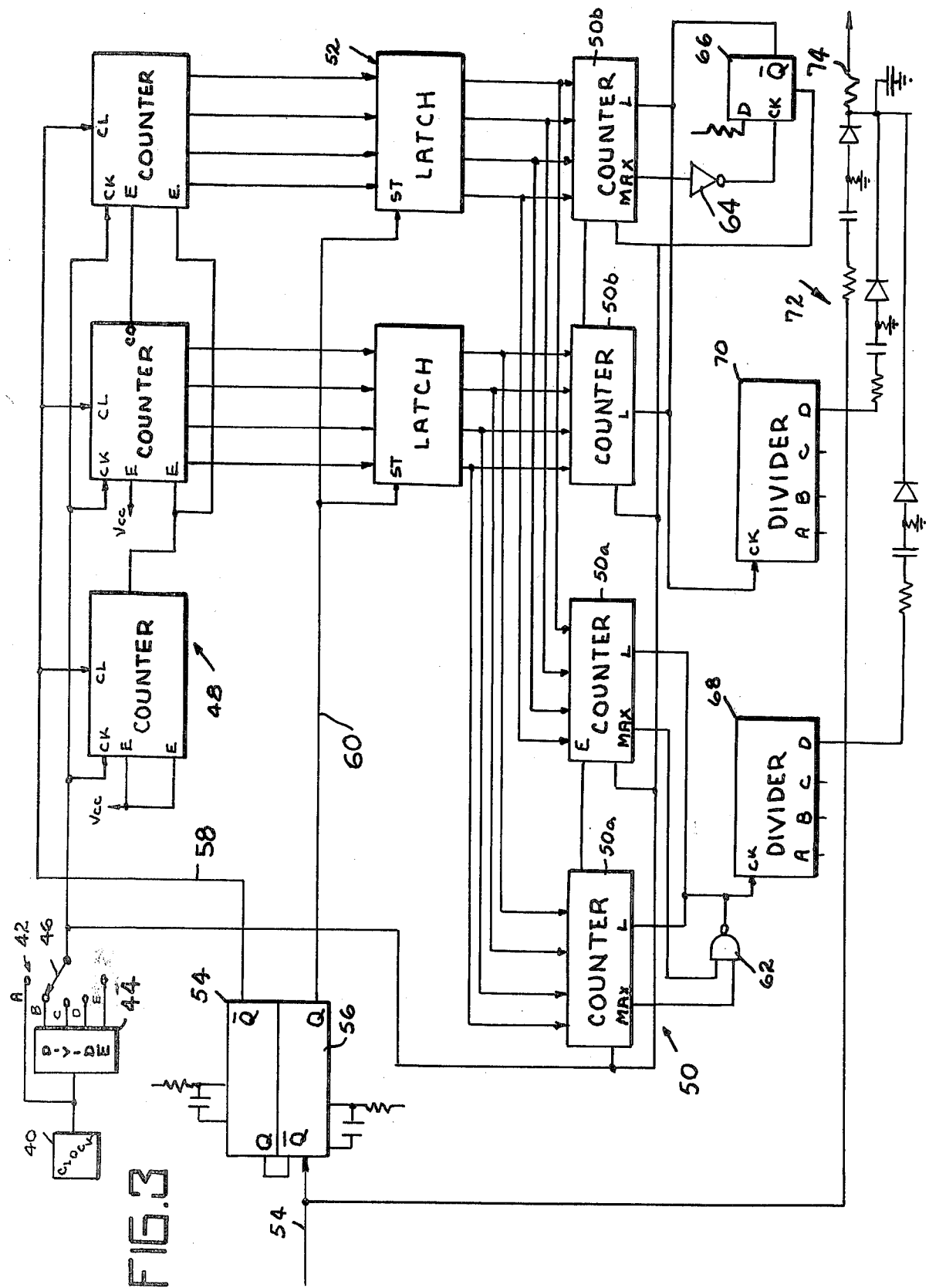

METHOD AND APPARATUS FOR GENERATING TONE SIGNALS AND THE LIKE

The present invention relates to a frequency multiplier or generator and is particularly concerned with a generator of this nature for generating signals for use as a tone generator for an electronic organ.

Tone generators for electronic organs are often quite expensive and can take different forms, such as an independent oscillator for each note of the scale, or what is known as a top octave synthesizer, in which a high precision, high frequency oscillator produces an output which is divided down to give frequencies corresponding to the top octave of a keyboard of the electronic organ.

In each case, the outputs corresponding to the highest frequency are divided down to provide lower frequencies for octaves beneath the upper octave of the electronic organ.

It has been found that a more pleasing tone output can be obtained from an organ providing for the de-tuning of at least some frequencies. For example, if a frequency corresponding to a particular note is combined with another frequency corresponding to the note but differing in basic frequency a small amount, a sort of celeste or choral effect is obtained which adds considerably to the tonal characteristics of the organ.

The present invention is particularly concerned with a frequency generator arrangement, especially for use as a tone generator in an electronic organ, which is relatively inexpensive and by means of which substantially any desired degree of de-tuning of produced frequencies relative to a given base frequency can be obtained.

BRIEF SUMMARY OF THE INVENTION

According to the present invention, a first counter is provided, the clock terminal of which is supplied from source of clock frequency. The counter has a plurality of output terminals at which a binary count appears corresponding to the number of pulses supplied thereto from the high frequency source. At least one second counter is provided of the modulo type so that when a count is loaded therein, the counter will count to a predetermined point, for example, all zeros or all ones, and will then automatically reload.

Interposed between the last mentioned counter and the first mentioned counter is a latch, which advantageously is of the inverting type, with the latch being connected between terminals of the first counter corresponding to the most significant bits for the terminals of the second counter.

A given reference frequency is then employed for clocking the latch and immediately thereafter clearing the first counter.

The output from the second counter which represents a different number of pulses than was supplied by the first counter is supplied to squaring means, such as a flip flop or divider, and the signal produced will, when divided down to near the reference frequency referred to, differ from the reference frequency by a predetermined desired amount. The last mentioned signal can be quite close to the frequency of the input signal or can differ therefrom a substantial amount, depending upon the effect it is desired to obtain.

The exact nature of the present invention will become more clearly apparent upon reference to the following detailed specification taken in connection with the accompanying drawings in which:

FIG. 3 is a schematic view showing how the system of the present invention can be employed for generating a frequency ensemble output for use in an electronic organ.

DETAILED DESCRIPTION OF THE INVENTION

Figure 1:
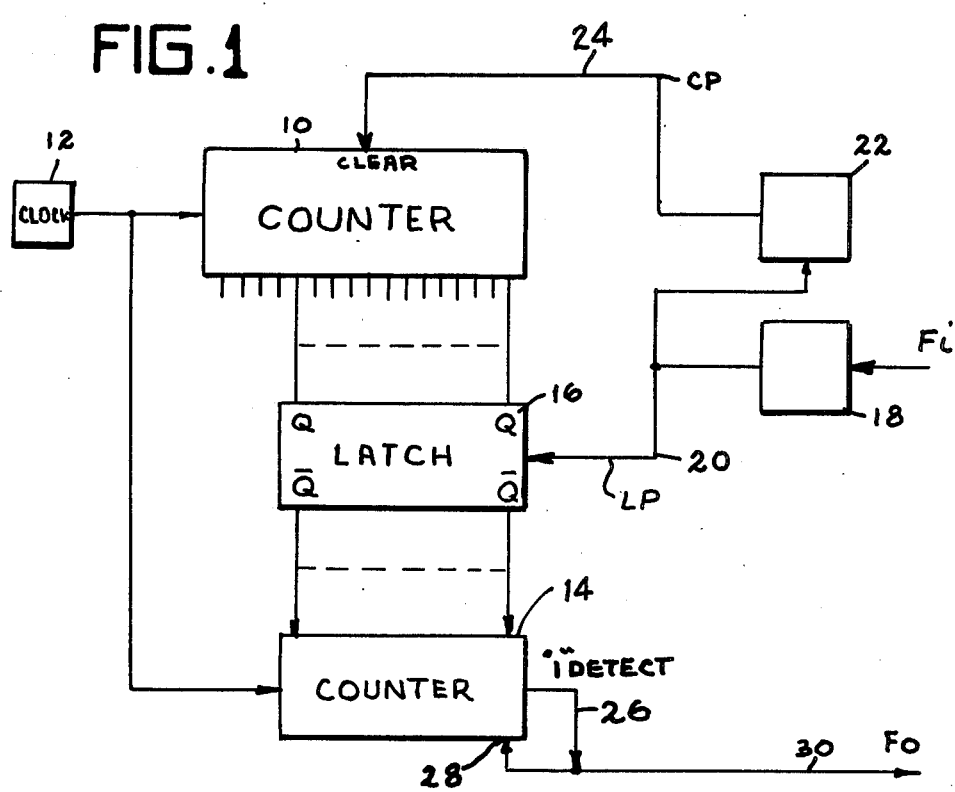
FIG. 1 is a schematic view showing a simplified circuit for practicing the present invention.

Referring to the drawings somewhat more in detail, a first counter 10 is supplied from a source 12 which may, in the particular instance shown, run at 6 megahertz. Counter 10 may, for example, be a seventeen bit counter.

A second counter 14 of the Modulo N type is provided and is also connected to clock 12 to receive pulses therefrom. Counter 14, rather than 17 bits, may comprise a 13 bit counter.

An inverting latch 16 has Q terminals on one side connected to the thirteen terminals of counter 10 commencing with the most significant bit and with the $\overline{Q}$ output terminals connected to the inputs of counter 14. It will be appreciated that the four least significant bit terminals of counter 10 are not connected so that the count transferred from counter 10 to latch 16, and thence, in inverted form, to counter 14 is, in fact, the count in counter 10 divided by a factor of about, but not necessarily exactly, 16.

A reference frequency indicated at Fi, and which may range from about 65 hertz up to about 2093 hertz, is supplied to a first flip flop 18 which supplies a pulse on line 20 which clocks latch 16. The pulse on line 20 also actuates a second flip flop 22, the output of which is conducted via line 24 to the clear input of counter 10.

As mentioned, the counter 14 is of the modulo type and will commence counting as soon as it is loaded and will count until the counter exhibits all zeros or all ones. In counter 14 in FIG. 1, wire 26 is employed which detects when the counter is set to all ones and operates through load terminal 28 to reload the counter. The output of counter 14 is supplied to wire 30 and represents reference frequency Fi multiplied by about sixteen. The last mentioned frequency is indicated Fo in FIG. 1.

Figure 2:
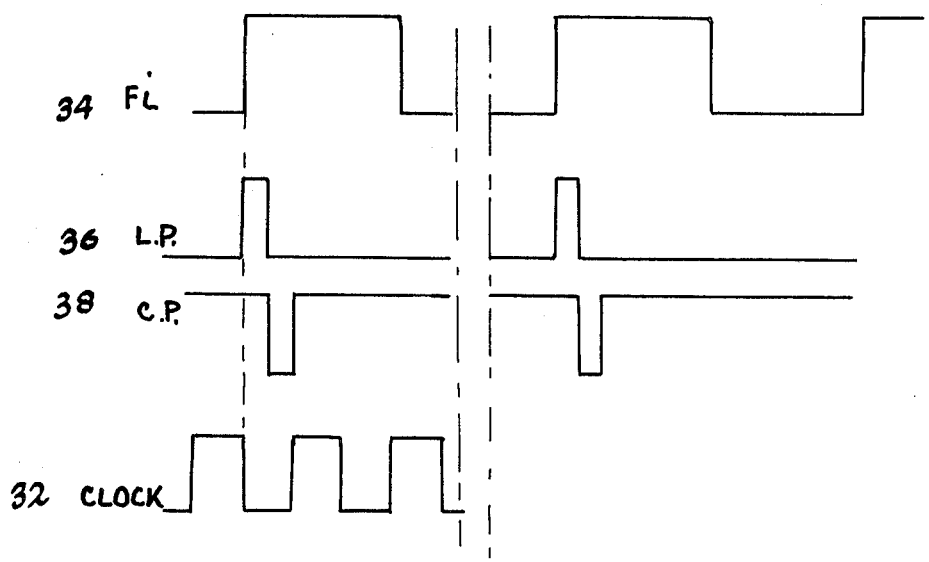
FIG. 2 is a graph showing the relationship of pulses occurring in the system of FIG. 1.

FIG. 2 is a graph with pulses plotted against time and with the line 32 of the graph showing the clock pulses from oscillator 12 with line 34 showing the reference pulses at Fi. The pulse shown by line 36, and which occurs on each rising edge of the Fi pulses, is the clocking pulse which is supplied to wire 20 for clocking latch 16 while the line 38 shows the pulses from flip flop 22 which it will be seen occur at the trailing edge of each pulse from flip flop 18. The pulses shown by line 38 are supplied by wire 24 to the clear input of counter 10.

In operation, counter 10 will accumulate a certain number of counts following the supply of a clearing pulse thereto until the next leading edge of the reference frequency occurs, at which time latch 16 is clocked and immediately thereafter counter 10 is cleared.

Counter 14, meanwhile, has been counting out the count loaded therein from latch 16 and will reload automatically when the count runs to either all zeros or all ones, depending on the nature of counter 14.

A practical embodiment of the circuit according to the present invention for use in an electronic organ is shown in FIG. 3. In FIG. 3, the high frequency reference source is indicated at 40 and may, in this case, comprise a 1½ megahertz crystal clock. The output of clock 40 is supplied directly to the first terminal of a switch arrangement 42 or through respective stages of a frequency divider 44 to other terminals of the switching arrangement. The switching arrangement comprises an arm 46 arranged to sweep over the contacts and connected to clock a first counter arrangement generally indicated at 48 and a second counter arrangement generally indicated at 50.

Counter arrangement 48 is made up of three counters, identified in the TTL handbook under type No. 74161, while the counters at 50 comprise two sets of counters, identified in the same handbook under type No. 74191.

The last mentioned counters at 50 are synchronous up or down counters with down and up mode control and are adjusted to count in the up mode because the load value is the complement of the counted number.

Interposed between counter means 48 and counter means 50 are the latch means 52 and which may consist of latches identified under type No. 74175.

The reference frequency is supplied via wire 54 to a dual monostable flip flop 56 which is type No. 74123.

The clearing pulse for counter means 48 is supplied thereto via wire 58, while the latch pulse for latch means 52 is supplied thereto via wire 60. The relationship of the pulses is illustrated adjacent the wires 58 and 60.

In the FIG. 3 arrangement, the portion of counter means 50 identified at 50a automatically reload when the counters reference all ones. This condition is indicated by a NAND gate 62 which develops a negative pulse at the output upon the supply of logic ones to the two inputs thereof and which negative pulse will effect loading of counters 50 from the outputs supplied by latch means 52.

The other two counters with counter means 50, and labeled 50b, are arranged to reload when all zeros are set up therein, and this condition is detected by means of an invertor 64 and flip flop 66 with flip flop 66 supplying a negative pulse to the load terminals of counters 50b when both thereof are at all zero condition.

The output from the counters at 50a is supplied to a first divider 68 while the output from counters 50b is supplied to a second divider 70. The outputs of dividers 68 and 70, of which the former is slightly sharp relative to the reference frequency with the latter somewhat flat relatively thereto are combined in a combining network 72 to supply a voice ensemble output to wire 74 for use in an electronic organ in any desired manner.

The particular frequency selected for switch 42 for different pitched ranges is given by the following chart:

| SOURCE FREQUENCY | | CLOCK |
| --- | --- | --- |
| 65 to 123 HZ | E = | 93,750 HZ |
| 130 to 246 HZ | D = | 187,500 HZ |
| 261 to 494 HZ | C = | 375,000 HZ |
| 523 to 988 HZ | B = | 750,000 HZ |
| 1046 to 2093 HZ | A = | 1,500,000 HZ |

In practice, counter means 48 will count to N' while counter means 50a will count to N and counter means 50b will count to N plus 1.

The particular degree of sharping or flatting of the outputs of dividers 68 and 70 relative to the reference frequency on wire 54 is, of course, variable in conformity with the number of terminals in counter 48 which are employed for supplying latch means 52 and therethrough counter means 50a and 50b.

The system according to the present invention is relatively inexpensive and represents a simple manner of obtaining multiples of a reference frequency and for providing for generating a frequency de-tuned relative to a given reference frequency a predetermined amount.

Modifications may be made within the scope of the appended claims.

What is claimed is:

1. A pulse generating circuit comprising: first binary counter means having a clock terminal and a clear terminal and a plurality of least significant bits output terminals and a plurality of most significant bits output terminals, second binary counter means having clock terminal means and load terminal means and output terminal means which pulses at a predetermined count in said second counter means and also having input terminal means for loading a count in said second counter means, latch means interposed between the input terminal means of said second counter means and the most significant bits output terminals of said first counter means, means for clocking said first and second counter means at a first higher frequency, first means for clocking said latch means at a second lower frequency, and second means for clearing said first counter means after clocking of said latch means, the frequency of the pulses at the output terminal means of said second counter means differing a small amount from a whole multiple of said second frequency.

2. A pulse generating circuit according to claim 1 which includes means for squaring the pulses from the output terminal means of said second counter means.

3. A pulse generating circuit according to claim 1 which includes means for squaring the pulse from the output terminal means of said second counter means and for dividing the frequency thereof to provide a pulse train having a frequency near but not equal to the said second frequency.

4. A pulse generating circuit according to claim 1 in which said second counter means comprises a pair of modulo counters each having an output terminal which pulses at a respective count in the pertaining counter, the pulse frequencies at the output terminals of said second counters differing a small amount from one another.

5. A pulse generating circuit according to claim 4 which includes means for squaring the pulses from the output(s) terminals of said modulo counters.

6. A pulse generating circuit according to claim 4 which includes means for squaring the pulses from the output terminals of said second modulo counters and for dividing the frequency thereof to provide pulse trains having frequencies near but different from said second frequency by respective amounts.

7. A pulse generating circuit according to claim 3 which includes a combining network in which said pulse train and said means for clocking said latch means are combined to form a single output.

8. A pulse generating circuit according to claim 6 which includes a combining network in which said pulse trains and said means for clocking said latch means are combined to form a single output.

9. A pulse generating circuit according to claim 1 in which said latch means inverts the signal at the output terminals of said first counter means.

10. The pulse generating circuit according to claim 1 wherein said second counter means is of the modulo type.

11. A pulse generating circuit according to claim 10 wherein the input terminal means of said second counter means are fewer in number than the combined output terminals of said first counter means, and said latch means is interposed between the input terminal means of said second counter means and the output terminals of said first counter means starting with the most significant bits terminals.

12. A pulse generating circuit according to claim 1 wherein said second means for clearing said first counter means clears said first counter means immediately after the clocking of said latch means.

13. A method of generating a pulse train having a frequency which differs a predetermined amount from a whole multiple of a reference frequency which comprises: supplying clock pulses at a higher frequency and supplying further reference pulses at a frequency lower than said higher frequency, repetitively counting the number of clock pulses during a cycle of said reference frequency and representing the count in the form of a first binary word, transferring a predetermined number less than the total number of the bits of said first binary word commencing at the most significant end of the word to a place of storage to form a second binary word of smaller value than said first binary word, transferring said predetermined number of bits at the beginning of each cycle of the reference frequency, repetitively counting off at least one of: the second binary word and the binary compliment thereof, during the respective cycle of said reference frequency and generating a pulse at the end of each said counting off to form a pulse train having a frequency differing a small amount from a whole multiple of said reference frequency.

14. The method according to claim 13 in which said transferred bits are inverted in said place of storage.

15. The method according to claim 14 which includes additionally counting off a binary word differing a small amount from said one of said second binary word and the complement thereof to generate additional pulses, and squaring said additional pulses to form a further pulse train differing in frequency a small amount from the other generated pulse train.

16. The method according to claim 13 which includes dividing the pulse train frequency down to produce pulses at a frequency differing a small amount from said reference frequency.

17. The method according to claim 13 which includes dividing both said pulse train frequencies down to produce pulses at frequencies which differ a small amount from each other and from said reference frequency.

18. The method according to claim 13 including squaring the pulses generated at the end of each said counting off.

* * * * *